Jan. 4, 1938.   P. G. WELLENKAMP   2,104,599
GEARED CONNECTING ROD
Filed Aug. 6, 1936
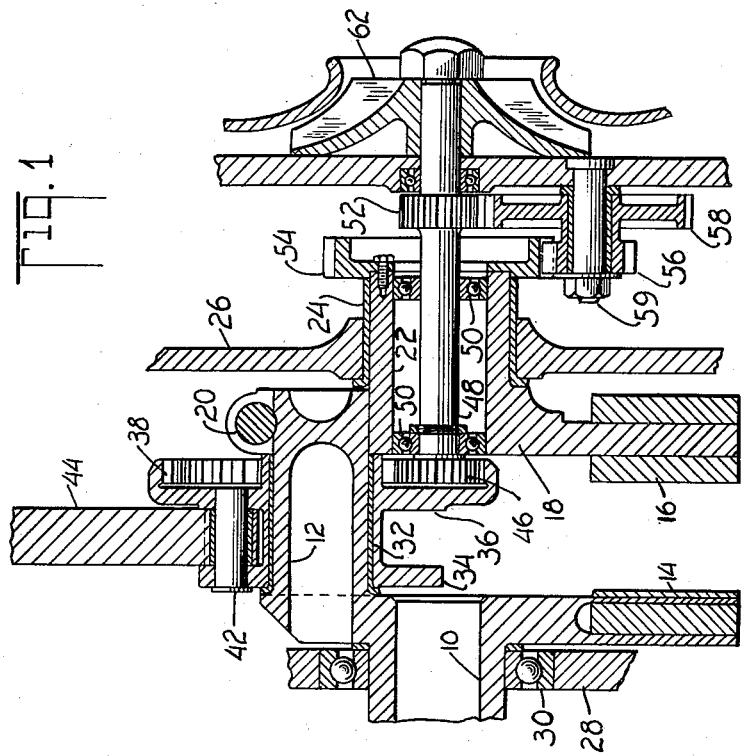
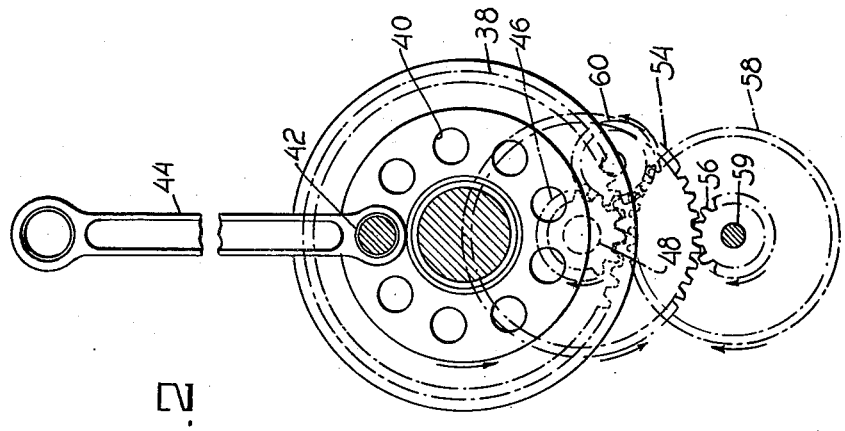
INVENTOR
PAUL G. WELLENKAMP
BY
ATTORNEY Patented Jan. 4, 1938

2,104,599

UNITED STATES PATENT OFFICE

2,104,599

GEARED CONNECTING ROD

Paul G. Wellenkamp, Radburn, N. J., assignor to Wright Aeronautical Corporation, a corporation of New York Application August 6, 1936, Serial No. 94,506

4 Claims. (Cl. 121—120)

This invention relates to connecting rods, and particularly to connecting rods for radial engines such as are used for aeronautical purposes.

The conventional construction comprises a master rod integral with the crankpin bearing member and provided with circumferentially spaced knuckle pins to which subsidiary link rods are articulated. This construction, due to the angularities of the master rod, introduces errors in the motions of the pistons attached to the articulated rods, causing errors in balance and unsymmetrical piston movement.

The prime object of the present invention is to provide novel and improved means for obtaining uniform motion for all the pistons of the radial engine.

This result is obtained by a novel form of gearing and an associated object is to additionally utilize such gearing for driving engine accessories.

Other objects of the invention will be obvious from, or will be pointed out in, the following description, with reference to the drawing, in which:

Fig. 1 is a fragmentary axial section through the crankshaft of the engine incorporating the invention, and Fig. 2 is a fragmentary end section of the gearing of Fig. 1.

In the drawing, 10 designates a conventional crankshaft, having a crankpin 12 provided with conventional counterweights 14—16, a rear crank cheek 18 being demountable by means of a clamp bolt 20 and having a hollow journal 22 supported in a bearing 24 carried in a rear wall 26 of the engine crankcase which also has a front wall 28 carrying a bearing 30 for the support of the front portion of the crankshaft 10.

Fitted to crankpin 12 is a connecting rod bearing or spool 32 including front and rear flanges 34—36 and a ring gear 38 shown as integral with the latter flange. The flanges 34—36 are bored at 40 to support circumferentially spaced knuckle pins 42 on which connecting rods 44 are articulated.

Meshed with the internal gear 38 is a pinion 46 on a shaft 48 mounted in bearings 50 in the rear journal 22 and carrying at its right hand end a second pinion 52. Mounted rigidly on the crankshaft is a gear 54, and the pinion 52 is driven from the crankshaft gear 54 through integral gears 56—58 borne on a stud 59 springing from the crankcase wall. An intermediate pinion 60 is introduced between the gear 58 and the pinion 52 so that the shaft 48 rotates backwards with respect to crankshaft, but at a speed greater than that of the crankshaft.

The ratio between the pinion 46 and the mating gear 38 of the connecting rod bearing being designated "R", the ratio of the gear train 54—56—58—60—52 is made as "R—1"; then the connecting rod bearing 38 will maintain a fixed attitude in its orbital motion upon the crankpin 12. For instance, the ratio of the internal gear 38 to the pinion 46 may be 5:1; the ratio of the gear 54 to the pinion 56 may be 2:1; and the ratio of the gear 58 to the pinion 52 may also be 2:1. Accordingly, then, the ratio of 5:1 may be designated as "R". The ratio of the gears 54, 56, 58, 52 cumulatively is 4:1 which is "R—1". Now, if the crankshaft 10 turns one revolution, the gear 54 likewise turns one revolution and the pinions 52 and 46 will turn four revolutions in reverse sense due to the idler pinion 60. Now, since the ratio of the pinion 46 to the gear 38 is 1:5, the gear 38 will turn backwardly one revolution with respect to the crankshaft gear 54 or, in other words, it will not rotate at all with respect to the engine crankcase while the crankshaft gear 54 rotates one turn forwardly. Thus, the spool 32 follows the orbital path of the crankpin without rotation, and each of the knuckle pins follows a circular path of the same radius as the crank throw instead of following the various elliptical paths characteristic of the conventional master rod construction.

Since the shaft 48 rotates at high speed relative to the crankshaft, any engine accessory requiring such high speed may be driven directly from this shaft or may be geared thereto to meet other speed requirements. In the drawing a supercharger impeller 62 has been indicated as mounted on the shaft 48, such impeller being representative of one accessory which may be driven by the high speed shaft 48.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. The combination with an engine crankshaft having a crank pin and a journal, of a connecting rod bearing member rotatable on said pin, rods articulated to said member, a gear rigid with said member, a shaft mounted for rotation in said journal, a pinion on said shaft engaging said bearing gear with a ratio designated "R", and gears drivably connecting said crankshaft and the last said shaft and giving a ratio of "R—1" of reverse rotation relative said crankshaft.

2. The combination with a crankshaft having a crankpin and a journal, of a control shaft rotatable in said journal, a connecting rod member bearing on said crankpin, rods articulated to said member, gears drivably connecting said control shaft to said member, and gears driving said control shaft from said crankshaft, said gears having ratios of "R" and "R—1" respectively.

3. In combination with a crankshaft having a crankpin and a journal, a control shaft rotatable in said journal, a connecting rod member bearing on said crankpin, an annular gear rigid with said member, a control shaft pinion of lesser diameter than said annular gear and mated therewith, and gear means to rotate said control shaft at such relatively high reverse speed with respect to said crankshaft as to restrain said connecting rod member from change in attitude during its orbital motion.

4. In combination, a crankshaft having a crankpin and a journal, a control shaft coaxial with said journal, two pinions rigid with said control shaft, a connecting rod member including a gear meshed with one of said pinions, and a gear means driving the other pinion from the crankshaft at such speed as to maintain said connecting rod member from rotation about its own axis during the orbital rotation of said axis.

PAUL G. WELLENKAMP.